United States Patent [19]

Parulski et al.

[11] Patent Number: 5,493,335
[45] Date of Patent: Feb. 20, 1996

[54] SINGLE SENSOR COLOR CAMERA WITH USER SELECTABLE IMAGE RECORD SIZE

[75] Inventors: Kenneth A. Parulski, Rochester; Richard M. Vogel, Pittsford, both of N.Y.; Seishi Ohmori, Tokyo, Japan

[73] Assignee: Eastman Kodak Company, Rochester, N.Y.

[21] Appl. No.: 85,516

[22] Filed: Jun. 30, 1993

[51] Int. Cl.[6] .................................................. H04N 5/76
[52] U.S. Cl. .......................... 348/233; 348/273; 358/906; 358/909.1
[58] Field of Search ............................. 358/209, 909, 358/906, 909.1; 348/207, 266, 272, 273, 233; H04N 5/30, 5/76

[56] References Cited

U.S. PATENT DOCUMENTS

| | | | |
|---|---|---|---|
| 3,971,065 | 7/1976 | Bayer | 358/41 |
| 4,412,252 | 10/1983 | Moore et al. | 358/160 |
| 4,468,755 | 8/1984 | Iida | 364/900 |
| 4,541,010 | 9/1985 | Alston | 358/44 |
| 4,623,922 | 11/1986 | Wischermann | 358/160 |
| 4,779,135 | 10/1988 | Judd | 358/183 |
| 4,821,121 | 4/1989 | Beaulier | 358/160 |
| 4,876,590 | 10/1989 | Parulski | 358/41 |
| 5,016,107 | 5/1991 | Sasson et al. | 358/209 |
| 5,018,017 | 5/1991 | Sasaki et al. | 358/209 |
| 5,040,068 | 8/1991 | Parulski et al. | 358/209 |
| 5,097,518 | 3/1992 | Scott et al. | 382/47 |
| 5,138,459 | 8/1992 | Roberts et al. | 358/209 |
| 5,164,831 | 11/1992 | Kuchta et al. | 358/209 |

OTHER PUBLICATIONS

"Popular Science", Sep. 1992, p. 65.

*Primary Examiner*—James J. Groody
*Assistant Examiner*—Cheryl Cohen
*Attorney, Agent, or Firm*—David M. Woods

[57] ABSTRACT

An electronic camera is adapted for processing images of different resolution to provide a user selectable image record size. A buffer memory is provided for storing color image pixels from a sensor as baseband signals corresponding to at least one image. A timing controller responsive to a resolution mode switch controls the order in which color image pixels are selected for storage in both vertical and horizontal directions. The order selected by the resolution switch includes a full resolution mode, and at least one reduced resolution mode in which the color image pixels are subsampled such that each chrominance image pixel is selected to be spatially adjacent to a selected luminance image pixel. Additionally, the buffer memory can store a burst of low resolution images.

15 Claims, 5 Drawing Sheets

SINGLE SENSOR COLOR CAMERA WITH USER SELECTABLE IMAGE RECORD SIZE

FIELD OF THE INVENTION

This invention relates to the field of electronic imaging and, in particular, to electronic still imaging by means of an electronic still camera having a single color sensor and semiconductor memory.

BACKGROUND OF THE INVENTION

It is known in the prior art to provide an electronic camera with variable resolution modes by which the memory capacity required for recording an image can be changed as required, for example, to cope with limited residual memory in the recording medium.

U.S. Pat. No. 5,018,017 is representative of a camera utilizing such variability in resolution modes. The problem in the prior art, as set forth in this patent, is that provision of different resolution modes complicates the compatibility of removable memory used in electronic cameras. Whereas signal processing may be simple in construction when data corresponding to each picture element is simply recorded in the removable memory, any change in the number of filter elements or the arrangement of the color filter accordingly changes the arrangement of data recorded in the memory or the amount of data per image recorded in the memory. This means that the recorded memory cannot be interchangeably used with other camera systems having different sensor arrangements. While this problem is always a serious shortcoming, it becomes even more serious, and complicated, when several resolution modes are provided because each mode is likely to be dependent upon the particular color filter arrangement in use.

U.S. Pat. No. 5,018,017 solves this problem by preprocessing the baseband image data from the sensor, in this case to form luminance and color difference signals, before providing any change in resolution. This achieves a degree of uniformity, regardless of the sensor being used. Four resolution modes are provided, a full resolution mode and a lower resolution mode obtained by subsampling the full resolution signal, and two lesser resolution modes obtained by using progressively lower quantization levels in compressing the lower resolution image. In each case, the progressively lowered resolutions are derived from a color signal that is already preconverted into a standardized form. These reduced resolution modes offer more image storage for a given memory and open the possibility of continuously photographing, and recording, a series of images in memory that would, at full resolution, only store one, or a few, images. As noted in U.S. Pat. No. 5,018,017, the upper limit of the speed attained during such a burst mode is restricted by the time required for writing into the removable memory.

The principal shortcoming of known camera systems with several resolution modes is the amount of signal processing that is done between image capture and the point at which data reduction occurs. The more processing that occurs, the more chance for noise to enter the system before the new reduced resolution image is constructed. Moreover, a principal reason for going to reduced resolution in the first place is to free up memory storage for the taking, and storage, of more pictures. The camera is then able to load as many pictures as possible, and as quickly as possible, into the camera memory. However, the camera disclosed in this patent limits the attained speed to the access time to the removable memory, a circumstance that basically does not take full advantage of the reduced resolution modes. This is particularly the case where the removable memory is, as is usually the case, the slowest memory in the system.

Consequently, an object of the invention is to collapse the processing chain between image capture and resolution reduction so that problems caused by intervening processing are avoided.

Another object is to fully utilize the collapsed processing interval for continuous photography so that a subsequent circuit element, such as the removable memory, does not appreciably limit the attainable speed.

A further object is to permit the user to select an image record size in accordance with the need, whether for continuous photography or added storage for any other reason.

SUMMARY OF THE INVENTION

In accordance with the invention, the aforementioned problems are solved with an electronic camera for processing images of different resolution, as set forth in the description of the preferred embodiments. As claimed, the camera includes an image sensor for generating a baseband image signal representative of color image pixels arranged in vertical and horizontal directions as obtained from a two-dimensional array of photosites covered by a pattern of luminance and chrominance color filters. A buffer memory includes sufficient capacity for storing the color image pixels as baseband signals corresponding to at least one image. An output memory, connected subsequent to the buffer memory, includes capacity for storing processed image signals obtained from the buffer memory. A resolution mode switch selects the pixel resolution of the image by specifying the order in which the color image pixels are selected for storage in both vertical and horizontal directions, the order including a full resolution mode in which all color image pixels are selected and at least one reduced resolution mode in which a fewer number of color image pixels are selected. A timing controller responsive to the pixel resolution selected by a resolution mode switch accordingly changes the number of horizontal and vertical pixels that represent the image by effecting a subsampling of the color image pixels for the reduced resolution mode. Finally, the selected color image pixels are stored in the output memory, such that the output memory is able to store more images in the reduced resolution mode than in the full resolution mode.

Several advantageous technical effects flow from the invention. One advantage is that each reduced resolution image directly corresponds to the image pixel data on the sensor, thus being a truer representation with less contamination by processing noise. Another advantage is that the processing channel before subsampling can be much simpler than in the prior art, with the usual attendant advantages in cost and speed. A further advantage is that the system can be designed to maximize incoming throughput into fast buffer memory, thus enhancing the speed of continuous photography. Other advantages and effects will become apparent in the ensuing description of the invention.

BRIEF DESCRIPTION OF THE DRAWINGS

The invention will be described in relation to the drawings, in which

FIG. 7 is a view of the color pattern shown in FIG. 3 with an overlay of a fourth subsampling pattern.

DESCRIPTION OF THE PREFERRED EMBODIMENTS

Since electronic still cameras employing a single color sensing device are well known, the present description will be directed in particular to elements forming part of, or cooperating more directly with, apparatus in accordance with the present invention. Elements not specifically shown or described herein may be selected from those known in the art.

Figure 1:
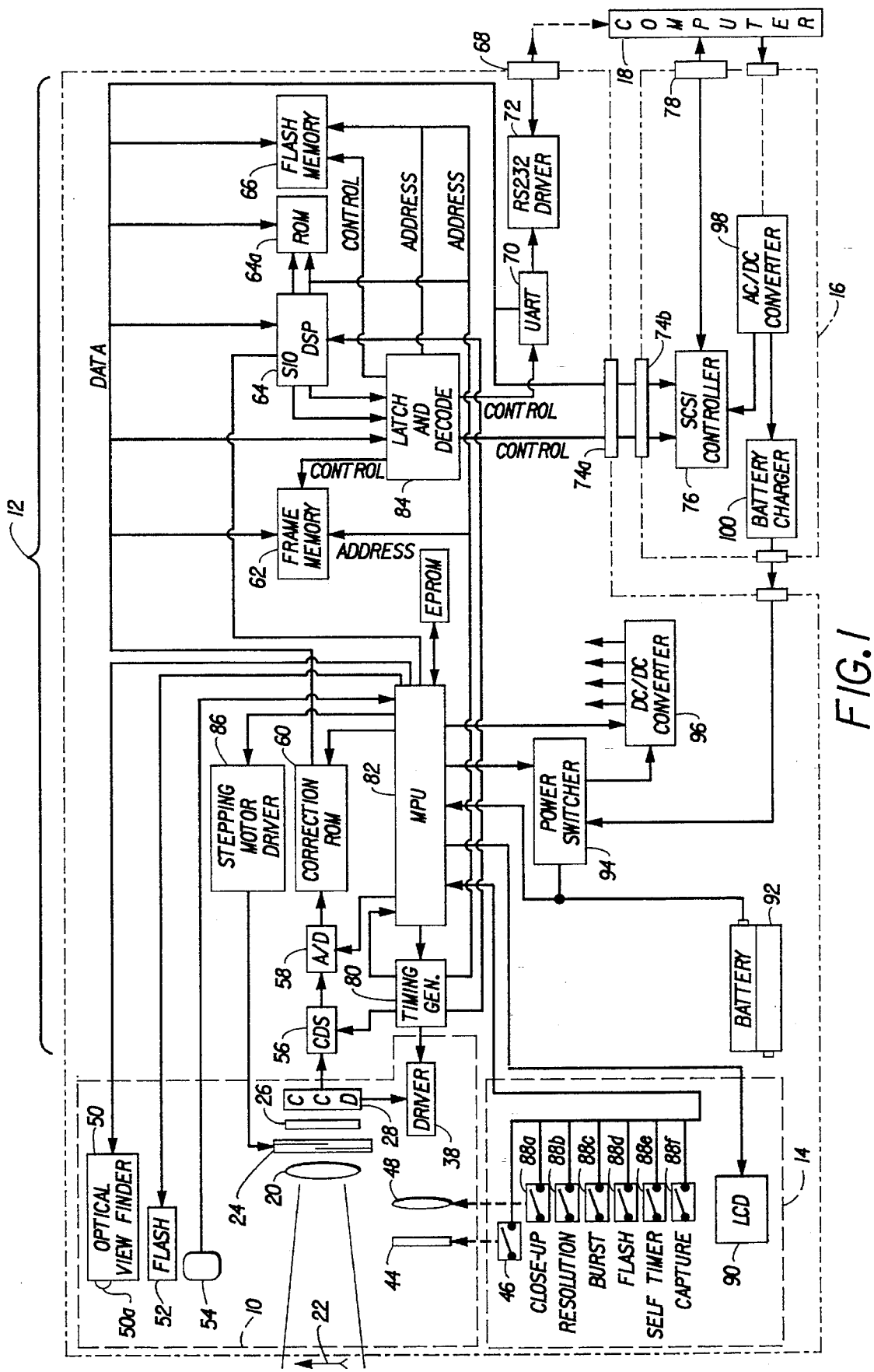
FIG. 1 is a block diagram of a single sensor color camera with user selectable image record size in accordance with the invention.

Referring initially to FIG. 1, the elements of a single sensor electronic camera are shown in block form. The camera is divided generally into an input section 10 for receiving image light and capturing an image, a processing and storage section 12 for processing and storing captured images, a control and display section 14 for user interface with the camera, and a detachable docking unit 16 for transferring stored images from the processing and storage section 12 to a host computer 18. The camera shown in FIG. 1 is sometimes referred to as a dockable electronic still camera, since it relates to the computer 16 generally through a docking unit 16 (although, as will be described, a serial port is provided on the camera body itself for direct connection with the computer 18).

Figure 2:
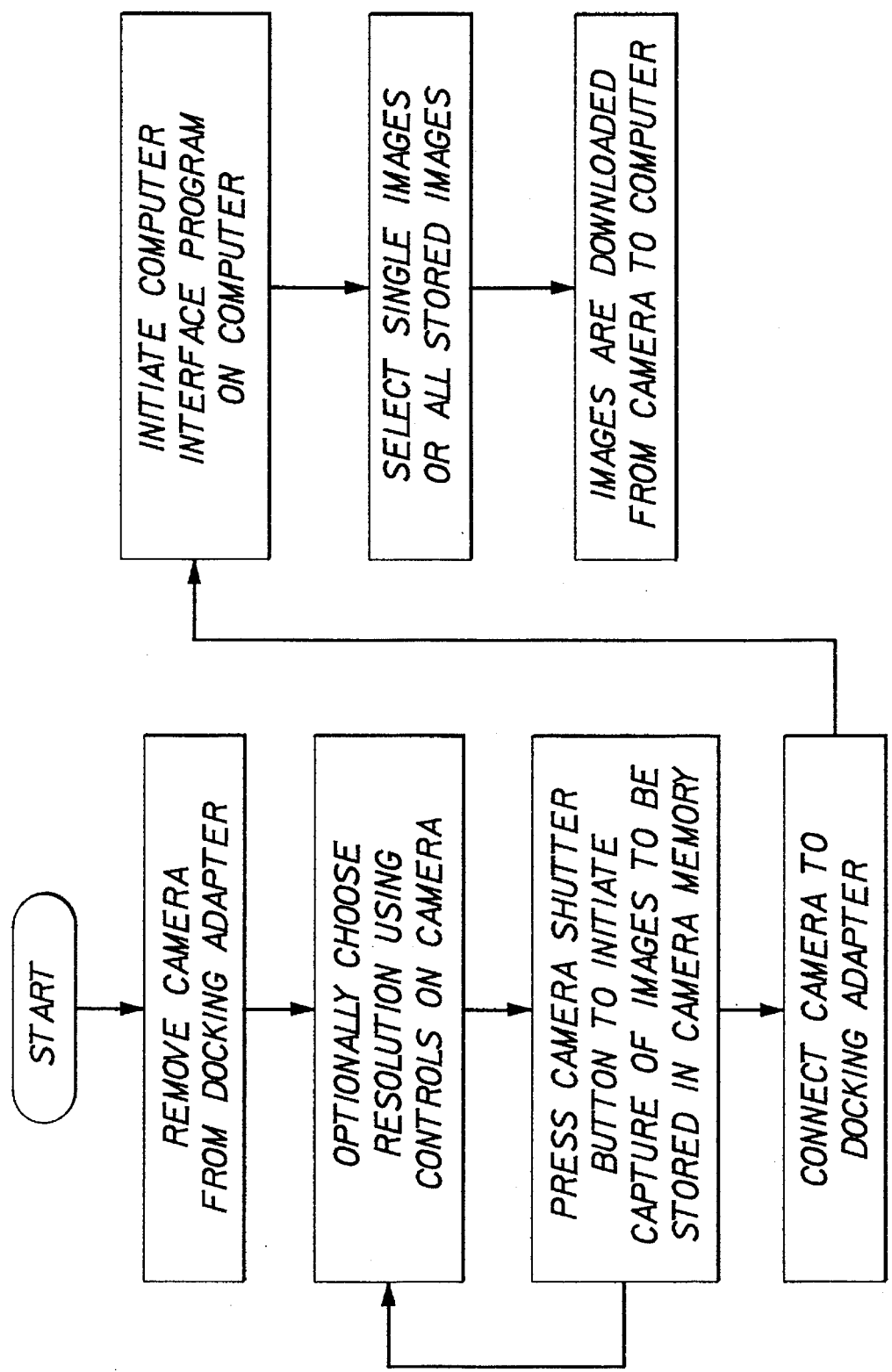
FIG. 2 is a flowchart showing the operation of the camera shown in FIG. 1.

The operation of the camera is generally shown in FIG. 2. With this type of imaging system, the camera is generally removed from the docking unit 16 and used at a location significantly remote from the computer 18. The camera is periodically returned to the computer, and images are then downloaded through the docking unit 16 (or the serial port) to free up the camera memory for more photographs. Because it is often inconvenient for the user to return to the computer to download images, the invention provides the user with the option to store some, or all, of the images at less than the highest resolution level, so that more images may be stored in the camera memory before having to return to the computer 18 to download the images. After the images are captured, the camera is connected to the docking adapter and the interface is initiated through the computer 18 (by appropriate software, which is not part of this invention). The desired images are selected, and perhaps previewed, through the computer 18, and accordingly downloaded to its resident memory.

The input section 10 includes a lens 20 for imaging light from an object 22 through a shutter and aperture control 24 and an optical low pass filter 26 upon a charge-coupled device (CCD) image sensor 28. The sensor 28 is shown in further detail in FIG. 3 to include a color filter array 30 overlying an array of photosites 32 (shown for illustration through a cutaway portion 34 of the color filter array 30. The color filter array 30 has a plurality of red, green, and blue elements 36a, 36b, and 36c arranged in the familiar "Bayer array" described in U.S. Pat. No. 3,971,065, which is incorporated herein by reference. A characteristic of one form of the "Bayer array" is that the luminance picture elements (pixels), i.e., corresponding to the green element 36b, are arranged horizontally and vertically in a checkerboard pattern, and the chrominance pixels, i.e., corresponding to the red and blue color elements 36a and 36c, are each vertically and horizontally adjacent to a luminance pixel. A driver 38 (shown in FIG. 1) generates clocking signals for controlling the image integration time and the vertical transfer of image pixels to a high speed horizontal register 40 (shown in FIG. 3). An output capacitive node 42 produces a signal which is amplified, processed, and stored in the processing and storage section 12.

Referring again to FIG. 1, the input section further includes a lens cap 44 connected to a main switch 46 that activates the camera when the cap 44 is moved to expose the lens 20 to image light, and a close-up lens 48 that can be optionally moved into the path of image light for close-up exposures. The input section also includes an optical viewfinder 50 for framing the object 22 in relation to the sensor 28, a flash unit 52 for illuminating the object 22, and a photocell 54 for converting image intensity information into an electrical signal that is used in the processing and storage section 12 to regulate the shutter and aperture control 24.

The processing and storage section 12 includes a correlated double sampling circuit 56 for providing analog image samples to a 10 bit analog-to-digital (A/D) converter 58. The 10 bit digitized signals are corrected for white balance, gamma, and other conventional distortions by a correction read-only memory (ROM) 60, which provides 8 bit output signals that are applied to a frame buffer memory 62, which is a 4 megabit dynamic random-access memory (RAM). The buffered image signals are processed, e.g., compressed, in a digital signal processor (DSP) 64 and then stored in an output memory, such as flash electrically programmable read-only memory (EPROM) 66. When the camera is to send image data to the computer 18, one of two data paths are used. A serial path from the flash EPROM memory 66 to a serial port 68 is provided through a universal synchronous/asynchronous receiver/transmitter (UART) 70 and an RS232 driver 72. Alternatively, a faster parallel path is provided through connectors 74a and 74b via a small computer systems interface (SCSI) controller 76 in the docking unit 16 to a parallel port 78.

A timing generator 80 provides timing signals to the aforementioned elements in the processing and storage section 12, in particular providing timing input to an 8-bit microprocessor controller 82 and address timing to the frame buffer memory 62, the DSP 64, the flash EPROM memory 66, and a latching and decoding circuit 84. The microprocessor controller in turn controls the A/D converter 58, the correction ROM 60, the flash unit 52, and a stepping motor driver 86, which controls operation of the shutter and aperture control 24. The microprocessor controller 82 also controls a display element 50a in the viewfinder 50 (for indicating flash ready, under/over exposure, and the like), and receives exposure data from the photocell 54.

While the processing and storage section 12 automatically controls image exposure upon the CCD sensor 28 by means of data input from the photocell 54, a plurality of switches are provided in the control and display section 14 for manually activating a variety of additional features. (Some switches directly activate the respective features, while other switches activate a menu of choices on a liquid crystal display (LCD) 90.) For instance, a switch 88a moves the close-up lens 48 into position, a switch 88b allows the user to select which of two (high or low) different resolution levels of sensor data are stored in the frame buffer memory 62, a switch 88c activates a low resolution "burst" mode in which several pictures are rapidly taken, a switch 88d activates the flash unit 52, and a switch 88e activates a self-timer delay mode. A capture switch 88f initiates each exposure. The liquid crystal display (LCD) 90 indicates the selected feature values. Depending upon the capabilities of the camera, further input may be provided, e.g., levels of compression (number of bits) may be selected, and the color mode (black/white or color) may be designated.

A battery 92 provides power to the camera through a power switcher 94 and a DC/DC converter 96 when the camera is disconnected from the docking unit 16. When the docking unit 16 is connected between the computer 18 and the camera, the computer supplies power to an AC/DC converter 98 in the docking unit 16, which in turns powers a battery charger 100 that connects to the camera and charges the battery 92.

In using the camera according to the invention, activation of the capture switch 88f allows the camera to capture one or a plurality of images, which are then stored in the flash EPROM memory 66, until they can be downloaded to the computer 18. The image which is read out from the sensor 28 has, in one embodiment, a total of 512 lines and 768 pixels per line. Since the sensor 28 incorporates a "Bayer" color filter pattern, the digitized values from the A/D converter 58 correspond to values from the various color elements 36a, 36b, 36c on the sensor 28. Eight bit digital pixel values are read from the CCD sensor 28 via ROM 60 at a 2 MHz readout rate and stored in the 4 megabit dynamic RAM frame buffer memory 62. About 200 msec are required to read one image from the sensor 28, and into the frame buffer memory 62. The image signals are then read from the frame buffer memory 62 at a slower speed, compressed using a DPCM algorithm (which compresses the image from 8 bits per pixel to 2 bits per pixel) implemented in the DSP 64 pursuant to instructions stored in a program ROM 64a, and stored in the flash EPROM memory 66, which can hold several compressed images. This process takes about 4 seconds, which means that full resolution images can only be stored in the flash EPROM memory 66 every 4 seconds. The use of the buffer memory 62 allows the DSP 64 to operate at a throughput rate different from the CCD sensor 28, as described in U.S. Pat. No. 5,016,107, entitled, "Electronic Still Camera Utilizing Image Compression and Digital Storage", which is incorporated herein by reference. The aforementioned latching and decoding circuit 84 accomplishes this separation of throughput rates by coordinating the requirement of the DSP 64 with control of the frame buffer memory 62 and the flash EPROM memory 66.

According to the invention, the camera includes the switch 88b which allows the user to select the image record size, that is, which of two different resolution levels of sensor data are stored in the frame buffer memory 62. When the switch 88b activates the "low resolution" mode, the timing generator 80 changes the timing to the buffer memory 62 so that, in one embodiment, only a quarter of the pixels on the CCD sensor 28 are stored in the memory 62. This quarter size image is then compressed by the DSP 64, and stored in the flash EPROM memory 66. It is thus possible to store four times as many low resolution images as high resolution images in the flash memory 66. In addition, it is possible to store up to five low resolution images rapidly into the buffer memory 62. Consequently, when the user holds down the capture switch 88b, with the burst mode enabled by actuation of the switch 88c, a burst of up to five low resolution images is taken in rapid succession. These images are then read out, one by one, compressed, and stored in the flash EPROM memory 66.

Figures 3, 4:
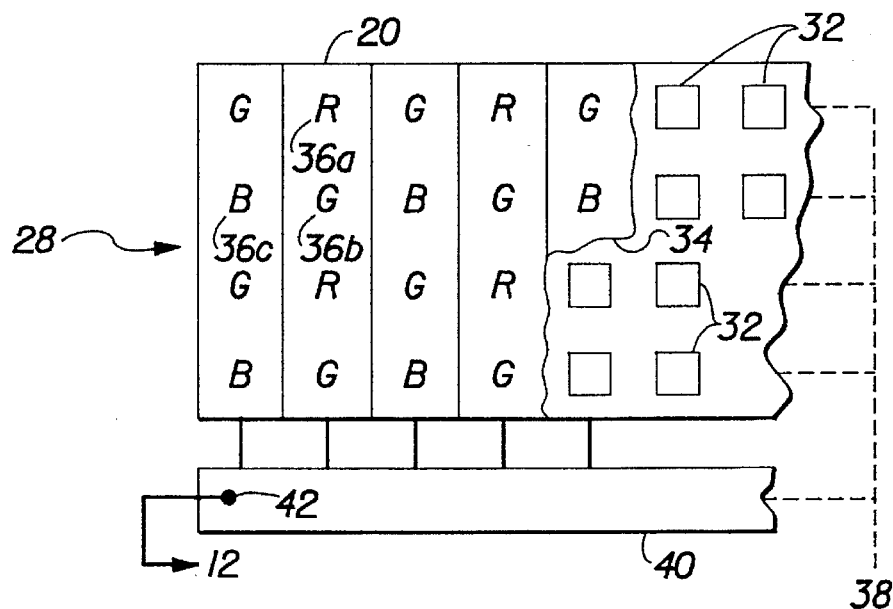
FIG. 3 is a view of a portion of the sensor shown in FIG. 1.
FIG. 4 is a view of the color pattern shown in FIG. 3 with an overlay of a first subsampling pattern.

In order to form the low resolution images, a suitable "subsampling" pattern is required. For example, if only every second pixel of every second line was selected for storage in the buffer memory, the image would contain only values of one of the three colors. To provide a color image, the color filter array pixels must be subsampled properly. This subsampling should be done in a manner that maintains good luminance resolution, without introducing false color "aliasing" artifacts. One subsampling pattern is shown in FIG. 4, with a circle surrounding each sampled pixel. In this pattern, the green (luminance) elements are subsampled in a checkerboard type arrangement, by selecting every second green element of every second line, but staggering the sampling by one element to form a "subsampled Bayer type checkerboard". The red and blue elements near the selected green elements are chosen in order to provide color samples which are spatially adjacent with at least some of the luminance samples. This minimizes the false color edges which might otherwise occur.

Figure 5:
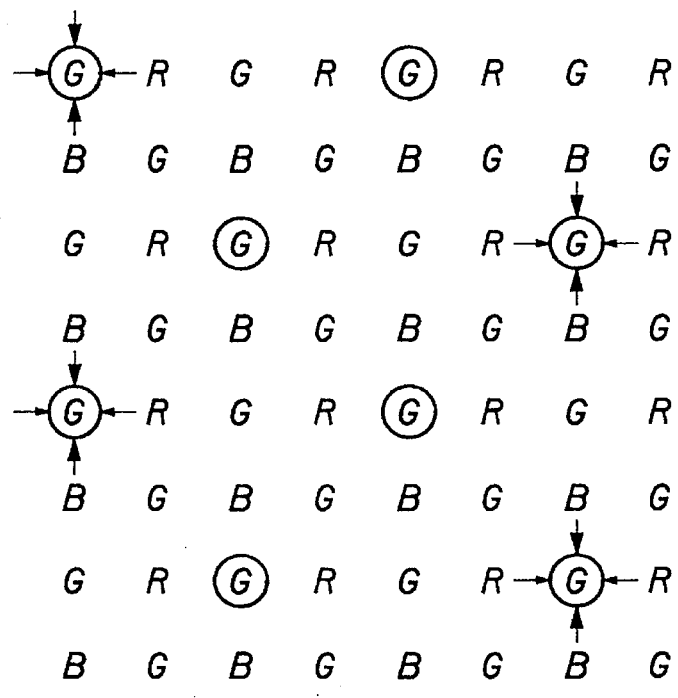
FIG. 5 is a view of the color pattern shown in FIG. 3 with an overlay of a second subsampling pattern.
Figure 6:
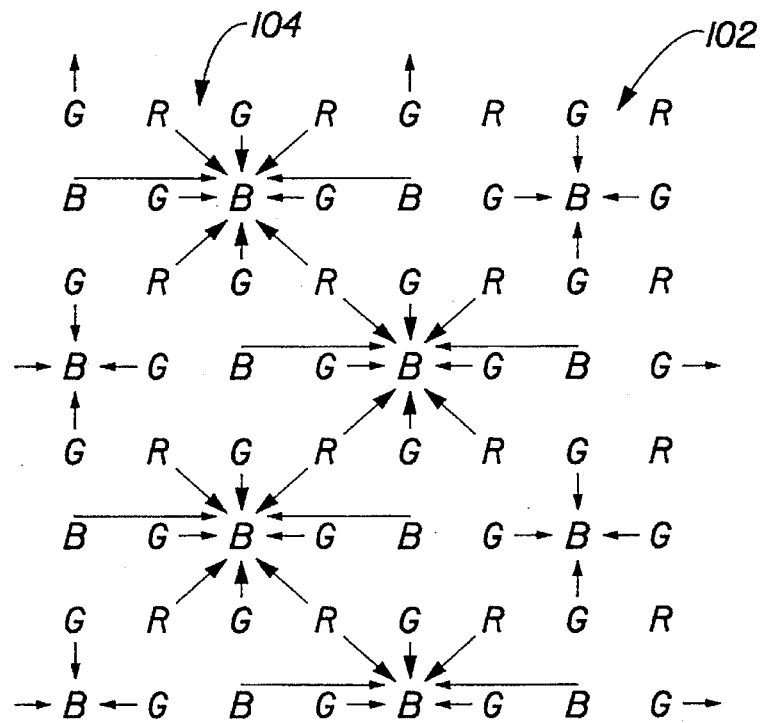
FIG. 6 is a view of the color pattern shown in FIG. 3 with an overlay of a third subsampling pattern.

In alternate subsampling patterns, the image is stored in the frame buffer memory 62 in the low resolution mode, and the DSP 64 processes the values from multiple pixels of the same color to form the color subsampled image, by averaging some of the pixels. One such pattern is shown in FIG. 5, with the (unaveraged) pixels surrounded by a circle and the averaged pixels at the base of respective arrows. Here, the green pixel values are used directly, while the two horizontally adjacent red values are averaged (as schematically shown by arrows) to form a red pixel value at every second green location, and the two vertically adjacent blue values are averaged (as shown by the arrows) to from a blue pixel value at the same locations. Green is not averaged, in order to maintain higher resolution. Unfortunately, this arrangement can cause some luminance aliasing. A further pattern, shown in FIG. 6, also averages the green values to eliminate this luminance aliasing. This averaging, however, also reduces the image sharpness. In FIG. 6, the 4 nearest green pixels in a "cross" shaped pattern in a first group 102 are averaged (as shown by the arrows). For every second group 104 of four green pixels, the four nearest red pixels are averaged, and one-half the value of the center blue pixel is summed with one-half the average value of the two horizontally adjacent blue elements. In all cases (FIGS. 4–6) the subsampling always maintains a ratio of two green pixel values, for every red or blue pixel value.

The subsampling illustrated by FIG. 4 is obtained by suitably programming the microprocessor controller 82 to instruct the timing generator 80 to produce address and control signals at the proper intervals so as to store only the values of the circled pixels of FIG. 4 into frame memory 62. The values from the non-circled pixels are not stored. The subsampling patterns illustrated by FIG. 5 and 6 are obtained by suitably programming the microprocessor controller 82 to instruct the timing generator 80 to produce address and control signals so as to store the pixel values which are either circled or at the tails of the arrows, in the respective figures.

Because only a fraction of the pixel values on the sensor 28 are stored for any of the subsampling modes shown in FIGS. 4–6, the frame memory 62 is sufficient to store multiple images. When the burst mode controlled by switch 88c is enabled, the microprocessor controller 82 instructs the timing generator to capture a burst of low resolution images and store the subsampled pixel values of each low resolution image in successive address areas of frame memory 62.

Because the subsampling pattern shown in FIG. 4 allows a smaller number of pixels to be stored in frame memory 62, it has, compared to the patterns shown in FIGS. 5–6, the advantage of allowing bursts containing a larger number of low resolution images to be captured at a relatively fast rate (approximately two frames per second) instead of at the slow rate (approximately four seconds per frame) of the high resolution mode, which is limited by the speed of flash memory 66 and DSP processor 64. In all cases, the requisite programming of the microprocessor controller 82 and the timing generator 80 is well within the talents of a programmer possessing the ordinary skills of this art. Other subsampling patterns may be useful; preferably these would also include chrominance elements (red or blue) spatially adjacent to luminance elements (green). Other filter arrays, and patterns, may be used, e.g., based on complementary colors (cyan, magenta, and yellow).

Sometimes a simplified version of the invention is preferred where the main advantage sought is the increased storage space, rather than a burst mode capability. A preferred "quarter size" subsampling pattern for such usage is shown in FIG. 7, with a circle surrounding each sampled pixel. In this case, all of the digitized image is stored in the frame memory 62. Clocking is thus simplified for the buffer memory 62 because only one clock, rather than two, is required. Then, the DSP 64 decimates the original pixels and generates a "quarter size" Bayer pattern image, as shown in FIG. 7. Because the DSP 64 is designed to be programmable, it is less difficult to have the DSP 64 do the "subsampling" than to specially program the clock for the buffer memory 62 to do the same.

The invention has been described in detail with particular reference to a preferred embodiment thereof, but it will be understood that variations and modifications can be effected within the spirit and scope of the invention. For example, while two resolution modes are disclosed in connection with the camera of FIG. 1, the same principles apply regardless of the number of modes. For instance, a third mode could further subsample the pattern of sampled elements shown in FIG. 4 to provide a yet lower resolution image.

| PARTS LIST |
| --- |
| 10 INPUT SECTION |
| 12 PROCESSING AND STORAGE SECTION |
| 14 CONTROL AND DISPLAY SECTION |
| 16 DETACHABLE DOCKING UNIT |
| 18 HOST COMPUTER |
| 20 LENS |
| 22 OBJECT |
| 24 SHUTTER AND APERTURE CONTROL |
| 26 OPTICAL LOW PASS FILTER |
| 28 CCD IMAGE SENSOR |
| 30 COLOR FILTER ARRAY |
| 32 PHOTOSITES |
| 34 CUT-AWAY PORTION OF THE SENSOR |
| 36A RED COLOR ELEMENT |
| 36B GREEN COLOR ELEMENT |
| 36C BLUE COLOR ELEMENT |
| 38 DRIVER |
| 40 HORIZONTAL REGISTER |
| 42 OUTPUT CAPACITATIVE NODE |
| 44 LENS CAP |
| 46 MAIN SWITCH |
| 48 CLOSE-UP LENS |
| 50 OPTICAL VIEWFINDER |
| 52 FLASH UNIT |
| 54 PHOTOCELL |
| 56 CORRELATED DOUBLE SAMPLING CIRCUIT |
| 58 A/D CONVERTER |
| 60 CORRECTION ROM |

| -continued |
| --- |
| PARTS LIST |
| 62 FRAME BUFFER MEMORY |
| 64 DSP |
| 64A PROGRAM ROM |
| 66 FLASH EPROM MEMORY |
| 68 SERIAL PORT |
| 70 UART |
| 72 RS232 DRIVER |
| 74A CONNECTOR |
| 74B CONNECTOR |
| 76 SCSI CONTROLLER |
| 78 PARALLEL PORT |
| 80 TIMING GENERATOR |
| 82 MICROPROCESSOR CONTROLLER |
| 84 LATCHING AND DECODING CIRCUIT |
| 86 STEPPING MOTOR DRIVER |
| 88A CLOSE-UP SWITCH |
| 88B RESOLUTION SWITCH |
| 88C BURST MODE SWITCH |
| 88D FLASH SWITCH |
| 88E SELF-TIMER SWITCH |
| 88F CAPTURE SWITCH |
| 90 LCD |
| 92 BATTERY |
| 94 POWER SWITCHER |
| 96 DC/DC CONVERTER |
| 98 AC/DC CONVERTER |
| 100 BATTERY CHARGER |
| 102 FIRST GROUP |
| 104 SECOND GROUP |

What is claimed is:

1. An electronic camera adapted for processing images of different resolution, said camera comprising:

an image sensor for generating a baseband image signal representative of color image pixels arranged in vertical and horizontal directions as obtained from a two-dimensional array of photosites covered by a pattern of luminance and chrominance color filters;

a buffer memory having sufficient capacity for storing the color image pixels as baseband signals corresponding to at least one image;

an output memory, connected subsequent to the buffer memory, for storing processed image signals obtained from the buffer memory;

a resolution mode switch for selecting a pixel resolution of the image by specifying an order in which the color image pixels are selected for storage in both vertical and horizontal directions, said order including a full resolution mode in which all color image pixels are selected and at least one reduced resolution mode in which less than all color image pixels are selected;

a controller responsive to the pixel resolution selected by the resolution mode switch for accordingly changing the number of horizontal and vertical pixels that represent the image, said controller effecting a subsampling of the color image pixels for the reduced resolution mode; and means for storing the selected color image pixels in said output memory, whereby said output memory is able to store more images in said reduced resolution mode than in said full resolution mode.

2. A camera as claimed in claim 1 in which said storing means stores a plurality of different resolution images in said output memory, depending on the resolution mode selected by said resolution mode switch for each image.

3. A camera as claimed in claim 1 in which said buffer memory is operable according to a timing signal that regulates the order in which the color image pixels are selected for storage in said buffer memory, and said controller responsive to the selected pixel resolution generates the timing signal and accordingly effects the subsampling by selecting appropriate pixels for storage in said buffer memory.

4. A camera as claimed in claim 1 wherein said controller further enables a burst mode wherein a multiplicity of subsampled images are stored in said buffer memory, and wherein said storing means subsequently transfers said subsampled images to said output memory.

5. A camera as claimed in claim 1 wherein said buffer memory is operable to store all of the color image pixels from said image sensor as baseband signals, and wherein said controller effectuates the subsampling for the selected pixel resolution by accordingly selecting appropriate pixels from said buffer memory for storage in said output memory.

6. A camera as claimed in claim 4 wherein said controller further averages certain of the selected pixels before storage in said output memory.

7. An electronic camera adapted for processing images of different resolution, said camera comprising:

an image sensor for generating a baseband image signal representative of color image pixels arranged in vertical and horizontal directions as obtained from a two-dimensional array of photosites covered by a pattern of luminance and chrominance color filters;

a buffer member having sufficient capacity for storing the color image pixels as baseband signals corresponding to at least one image, said memory operable according to a timing signal that regulates the order in which the color image pixels are selected for storage in said buffer memory;

a resolution mode switch for selecting a pixel resolution of the stored image by specifying an order in which the color image pixels are selected for storage in both vertical and horizontal directions, said order including a full resolution mode in which all color image pixels are stored and at least one reduced resolution mode in which a fewer number of color image pixels are stored; and a timing controller responsive to the pixel resolution selected by the resolution mode switch for generating the timing signal and accordingly changing the number of horizontal and vertical pixels that represent the image, said timing signal effecting a subsampling of the color image pixels for the reduced resolution mode wherein each chrominance image pixel is selected to be spatially adjacent to a selected luminance image pixel.

8. An electronic camera adapted for processing images of different resolution, said camera comprising:

an image sensor for generating a baseband image signal representative of color image pixels arranged in vertical and horizontal directions as obtained from a two-dimensional array of photosites covered by a pattern of luminance and chrominance color filters;

a buffer memory having sufficient capacity for storing the color image pixels as baseband signals corresponding to at least one image, said memory operable according to a timing signal that regulates the order in which the color image pixels are selected for storage in said buffer memory;

a resolution mode switch for selecting a pixel resolution of the stored image by specifying an order in which the color image pixels are selected for storage in both vertical and horizontal directions, said order including a full resolution mode in which all color image pixels are stored and at least one reduced resolution mode in which less than all color image pixels are stored; and a timing controlling responsive to the pixel resolution selected by the resolution mode switch for generating the timing signal and accordingly changing the number of horizontal and vertical pixels that represent the image, said timing signal effecting a subsampling of the color image pixels for the reduced resolution mode wherein (a) the luminance image pixels are subsampled in a checkerboard-type arrangement and (b) the chrominance image pixels are subsampled so as to be spatially adjacent to a luminance image pixel.

9. An electronic camera adapted for processing images of different resolution, said camera comprising:

an image sensor for generating a baseband image signal representative of color image pixels arranged in vertical and horizontal directions as obtained from a two-dimensional array of photosites covered by a pattern of luminance and chrominance color filters;

a buffer memory having sufficient capacity for storing the color image pixels as baseband signals corresponding to at least one image, said buffer memory operable according to a timing signal that regulates the order in which the color image pixels are selected for storage in said buffer memory;

a resolution mode switch for selecting a pixel resolution of the stored image by specifying an order in which the color image pixels are selected for storage in both vertical and horizontal directions, said order including a full resolution mode in which all color image pixels are stored and at least one reduced resolution mode in which less than all color image pixels are stored;

a timing controller responsive to the pixel resolution selected by the resolution mode switch for generating the timing signal and accordingly changing the number of horizontal and vertical pixels that represent the image, said timing signal effecting a subsampling of the color image pixels for the reduced resolution mode wherein each chrominance image pixel is selected to be spatially adjacent to a luminance image pixel;

a signal processor for generating a processed image signal by compressing the baseband image signal stored in said buffer memory; and an output memory having sufficient capacity for storing the processed image signal corresponding to at least one full resolution image, or to a greater number of reduced resolution images.

10. A camera as claimed in claim 9 in which said output memory stores a combination of said full resolution and reduced resolution images, depending on the resolution mode selected by said resolution mode switch for each image.

11. An electronic camera adapted for processing images of different resolution, said camera comprising:

an image sensor for generating a baseband image signal representative of color image pixels arranged in vertical and horizontal directions as obtained from a two-dimensional array of photosites covered by a pattern of luminance and chrominance color filters;

means for exposing said image sensor to image light from at least one image;

a buffer memory having sufficient capacity for storing the color image pixels as baseband signals corresponding to at least one image, said buffer memory operable according to a timing signal that regulates the order in which the color image pixels are selected for storage in said buffer memory;

a resolution mode switch for selecting a pixel resolution of the stored image by specifying an order in which the color image pixels are selected for storage in both vertical and horizontal directions, said order including a full resolution mode in which all color image pixels are stored and at least one reduced resolution mode in which less than all color image pixels are stored;

a timing controller responsive to the pixel resolution selected by the resolution mode switch for generating the timing signal and accordingly changing the number of horizontal and vertical pixels that represent the image, said timing signal effecting a subsampling of the color image pixels for the reduced resolution mode wherein each chrominance image pixel is selected to be spatially adjacent to a luminance image pixel;

a signal processor for generating a processed image signal by compressing the baseband image signal stored in said buffer memory;

an output memory having sufficient capacity for storing the processed image signal corresponding to at least one full resolution image, or to a greater number of reduced resolution images; and means responsive to the reduced resolution mode selected by said resolution mode switch for enabling said exposing means to continuously expose said sensor to a series of images, whereby a corresponding series of processed image signals are generated by said signal processor and stored in said output memory.

12. An electronic camera adapted for processing images of different resolution, said camera comprising:

an image sensor for generating a baseband image signal representative of color image pixels arranged in vertical and horizontal directions as obtained from a two-dimensional array of photosites covered by a checkerboard pattern of luminance and chrominance color filters in which each luminance image pixel is horizontally and vertically adjoined by a chrominance image pixel;

a buffer memory having sufficient capacity for storing the color image pixels as baseband signals corresponding to at least one image;

a signal processor for generating a processed image signal by compressing the baseband image signal stored in said buffer memory; and a resolution mode switch for selecting a pixel resolution mode of the image selected for compression, said resolution modes including a full resolution mode in which all color image pixels are processed for compression and at least one reduced resolution mode in which less than all color image pixels are produced by averaging at least some of the color image pixels before compression.

13. A camera as claimed in claim 12 in which the fewer number of color image pixels produced in the reduced resolution mode include a subsampled array of luminance image pixels and averaged values of the chrominance image pixels horizontally and vertically adjacent to at least some of the subsampled luminance image pixels.

14. A camera as claimed in claim 12 in which the fewer number of color image pixels produced in the reduced resolution mode include averages of luminance image pixels both horizontally and vertically adjacent to an array of chrominance image pixels.

15. A camera as claimed in claim 12 in which the fewer number of color image pixels produced in the reduced resolution mode represent luminance and chrominance values that are averaged over an array of positions that are adjacent to an array of chrominance image pixels.

* * * * *

(12) EX PARTE REEXAMINATION CERTIFICATE (8115th)
United States Patent
Parulski et al.

(10) Number: US 5,493,335 C1
(45) Certificate Issued: Mar. 29, 2011

(54) SINGLE SENSOR COLOR CAMERA WITH USER SELECTABLE IMAGE RECORD SIZE

(75) Inventors: Kenneth A. Parulski, Rochester, NY (US); Richard M. Vogel, Pittsford, NY (US); Seishi Ohmori, Tokyo (JP)

(73) Assignee: Eastman Kodak Company, Rochester, NY (US)

Reexamination Request:
No. 90/010,630, Jul. 31, 2009
No. 90/010,910, Apr. 12, 2010

Reexamination Certificate for:
Patent No.: 5,493,335
Issued: Feb. 20, 1996
Appl. No.: 08/085,516
Filed: Jun. 30, 1993

(51) Int. Cl.
*H04N 9/04* (2006.01)
*H04N 5/335* (2006.01)

(52) U.S. Cl. .................... 348/231.6; 348/273; 358/906; 358/909.1

(58) Field of Classification Search .................... 348/233
See application file for complete search history.

(56) References Cited

U.S. PATENT DOCUMENTS

| | | |
|---|---|---|
| 3,971,065 A | 7/1976 | Bayer |
| 4,131,919 A | 12/1978 | Lloyd et al. |
| 4,213,145 A | 7/1980 | Nagumo |
| 4,546,390 A | 10/1985 | Konishi et al. |
| 4,597,005 A | 6/1986 | Baleshta et al. |
| 4,730,222 A | 3/1988 | Schauffele |
| 4,746,980 A | 5/1988 | Petersen |
| 4,746,993 A | 5/1988 | Tada |
| 4,758,883 A | 7/1988 | Kawahara et al. |

(Continued)

FOREIGN PATENT DOCUMENTS

| | | |
|---|---|---|
| JP | 63-064485 | 3/1988 |
| JP | 63-286078 | 11/1988 |
| JP | H1-243686 | 9/1989 |
| JP | H2-214271 | 8/1990 |
| JP | H03-1681 | 1/1991 |
| JP | 3-284079 | 12/1991 |
| JP | 4-35181 | 1/1992 |
| JP | 4-35181 | 2/1992 |
| JP | 4-239279 | 8/1992 |
| JP | 4-319893 | 11/1992 |
| JP | 4-324778 | 11/1992 |

OTHER PUBLICATIONS

W. K. Pratt, Digital Image Processing, 1978, pp. 93–198, 307–377, 591–731,736–741, John Wiley & Sons, Inc.
M. Sasaki et al., Digital Electronic Still Camera System, ITEJ Technical Report, Mar. 1989, pp. 17–22, vol. 13, No. 22.
Fujimori et al., Digital Card Camera, ITEJ Technical Report, Jan. 18, 1990, pp. 7–12, vol. 14, No. 5.
F. Izawa et al., Digital Still Video Camera Using Semiconductor Memory Card, IEEE Transactions on Consumer Electronics, Feb. 1990, vol. 36 No. 1.
G. K. Wallace, Overview of the JPEG (ISO/CCITT) Still Image Compression Standard, SPIE, 1990, pp. 220–233, vol. 1244.
N. Watanabe et al., Bit Rate Controlled DCT Algorithm for Digital Camera, SPIE, 1990, pp. 234–239, vol. 1244.

(Continued)

*Primary Examiner*—Linh M. Nguyen

(57) ABSTRACT

An electronic camera is adapted for processing images of different resolution to provide a user selectable image record size. A buffer memory is provided for storing color image pixels from a sensor as baseband signals corresponding to at least one image. A timing controller responsive to a resolution mode switch controls the order in which color image pixels are selected for storage in both vertical and horizontal directions. The order selected by the resolution switch includes a full resolution mode, and at least one reduced resolution mode in which the color image pixels are sub-sampled such that each chrominance image pixel is selected to be spatially adjacent to a selected luminance image pixel. Additionally, the buffer memory can store a burst of low resolution images.

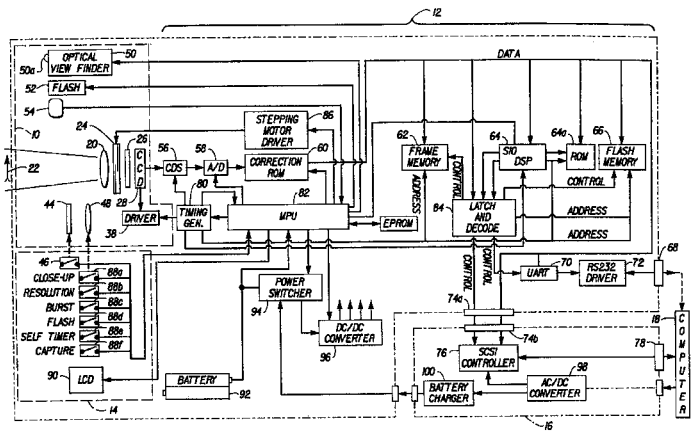

U.S. PATENT DOCUMENTS

| | | | |
|---|---|---|---|
| 4,764,805 | A | 8/1988 | Rabbani et al. |
| 4,774,562 | A | 9/1988 | Chen et al. |
| 4,837,628 | A | 6/1989 | Sasaki |
| 4,918,523 | A | 4/1990 | Simon et al. |
| 5,014,059 | A | 5/1991 | Seckora |
| 5,016,107 | A | 5/1991 | Sasson et al. |
| 5,018,017 | A | 5/1991 | Sasaki et al. |
| 5,027,214 | A | 6/1991 | Fujimori |
| 5,034,804 | A | 7/1991 | Sasaki et al. |
| 5,053,861 | A | 10/1991 | Tsai et al. |
| 5,067,019 | A | 11/1991 | Juday et al. |
| 5,097,518 | A | 3/1992 | Scott et al. |
| 5,128,776 | A | 7/1992 | Scorse et al. |
| 5,138,459 | A | 8/1992 | Roberts et al. |
| 5,153,730 | A | 10/1992 | Nagasaki et al. |
| 5,233,411 | A | 8/1993 | Nam et al. |
| 5,262,871 | A | 11/1993 | Wilder et al. |
| 5,280,343 | A | 1/1994 | Sullivan |
| 5,305,096 | A | 4/1994 | Yamagami et al. |
| 5,335,016 | A | 8/1994 | Nakagawa |
| 5,402,170 | A | 3/1995 | Parulski et al. |
| 6,084,633 | A | 7/2000 | Gouhara et al. |
| 6,518,999 | B1 | 2/2003 | Miyamoto |

OTHER PUBLICATIONS

M. Sasaki, Signal Processing Technologies for a Digital Still Camera System, Toshiba Review, 1991, vol. 46 No. 2.

W. B. Pennebaker et al., JPEG: Still Image Data Compression Standard, 1993, pp. 1–27, 64–79, 252–259, 316–330.

R.A.F. Belfor et al., "Subsampling of Digital Image Sequences using Motion Information," Motion Analysis and Image Sequence Processing 189 (M. Ibrahim Sezan and Reginald L. Lagendijk eds., 1993).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 4 and 12 is confirmed.

Claims 2, 3, 5-11, 13-15 were not reexamined.

* * * * *